(12) United States Patent
Yoneyama et al.

(10) Patent No.: US 8,653,791 B2
(45) Date of Patent: Feb. 18, 2014

(54) BATTERY CHARGER FOR HAND-HELD ELECTRONIC GAME DEVICE

(75) Inventors: Kazuo Yoneyama, Kyoto (JP); Hideki Arita, Kyoto (JP); Yuko Zenri, Kyoto (JP); Kumpei Fujita, Kyoto (JP); Hideaki Kamata, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 343 days.

(21) Appl. No.: 13/096,542

(22) Filed: Apr. 28, 2011

(65) Prior Publication Data

US 2012/0274282 A1 Nov. 1, 2012

(51) Int. Cl.
*H02J 7/00* (2006.01)
*G06F 1/16* (2006.01)

(52) U.S. Cl.
USPC ..................................... 320/115; 361/679.32

(58) Field of Classification Search
USPC ..................................... 320/115; 361/679.32
See application file for complete search history.

(56) References Cited

U.S. PATENT DOCUMENTS

| | | | | |
|---|---|---|---|---|
| 6,034,505 A | * | 3/2000 | Arthur et al. | 320/113 |
| 6,046,571 A | * | 4/2000 | Bovio et al. | 320/113 |
| 6,329,786 B1 | * | 12/2001 | Ono | 320/113 |
| 6,696,922 B1 | * | 2/2004 | Wong et al. | 340/7.32 |
| 8,269,454 B2 | * | 9/2012 | Yang | 320/107 |
| 8,442,455 B2 | * | 5/2013 | Choi | 455/90.3 |
| 2007/0263348 A1 | * | 11/2007 | Rutledge et al. | 361/681 |
| 2008/0164845 A1 | * | 7/2008 | Choi | 320/115 |
| 2010/0127661 A1 | * | 5/2010 | Stocking | 320/115 |
| 2012/0133328 A1 | * | 5/2012 | Chen | 320/115 |

FOREIGN PATENT DOCUMENTS

AU 155141 4/2004

OTHER PUBLICATIONS

Russian Official Action (w/English translation) dated May 11, 2011 for Application No. 2010503597, filed Sep. 12, 2010.

* cited by examiner

*Primary Examiner* — M'baye Diao
(74) *Attorney, Agent, or Firm* — Nixon & Vanderhye, P.C.

(57) ABSTRACT

A charging cradle for an electronic game device incorporating a rechargeable battery includes a housing having first and second surfaces with a peripheral edge wall therebetween, the housing forming a substantially closed interior chamber. At least one port is provided in the peripheral edge wall adapted to receive a charging wire connector, the port electrically connected to charging contacts supported within the closed interior chamber and movable from a normal retracted position to a use extended position where tips of the contacts project from the housing. An actuator button on the first surface is operatively connected to the pair of charging ports, such that upon engaging the electronic game device with the first surface, the button is depressed, causing the pair of charging contacts to move to the extended position to engage corresponding charging ports on a peripheral edge of the electronic game device.

34 Claims, 20 Drawing Sheets

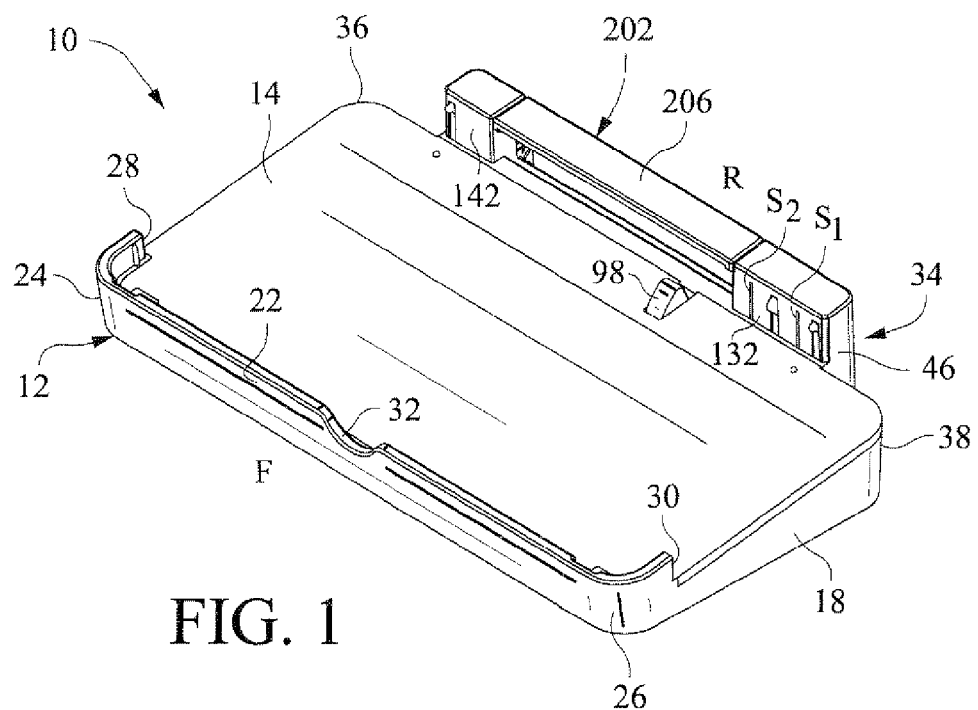

BATTERY CHARGER FOR HAND-HELD ELECTRONIC GAME DEVICE

This invention relates to a battery charger for an electronic device, and specifically, to a cradle adapted to hold and support a portable, hand-held electronic video game device during the charging process.

BACKGROUND

Battery chargers for hand held electronic devices, such as cell phones, portable digital assistants, digital cameras and the like typically include an AC adapter with a wire and wall outlet plug extending from one side of the adapter, and a wire with a coaxial or other connector that can be plugged directly into the device extending from the other side of the adapter. Other chargers may include a charger stand on which the device is placed that establishes an electrical connection with the device, with a wire and wall outlet plug extending from the charger stand. In chargers of the latter type, contacts on the device itself and/or the charger stand, are typically exposed and subject to damage. In addition, for hand-held electronic video game devices, the use of a charger stand typically precludes game operation during the charging process.

BRIEF DESCRIPTION OF THE INVENTION

The battery charging device, or cradle, described herein protects the electrical contacts on the cradle when the cradle is not in use, and automatically engages the electronic game device charging contacts upon loading of the game device onto the cradle. The cradle also provides spring-based locators that aid in locating and holding the game device relative to the cradle. In addition, the cradle is configured to allow user access to game control buttons and to a game card slot on the peripheral edge of the game device so that the game device can be operated while being charged.

Thus, in one exemplary but nonlimiting aspect, there is provided a charging cradle for an electronic game device incorporating a rechargeable battery comprising a housing having a first surface and a second surface with a peripheral edge wall therebetween, the housing forming a substantially closed interior chamber, the first surface adapted to engage the electronic game device; at least one port in the peripheral edge wall adapted to receive a charging wire connector, the port electrically connected to a pair of charging contacts supported within the substantially closed interior chamber and movable from a normal retracted position where tips of the charging contacts are inside the housing to an in-use extended position where the tips project from the housing; and an actuator button on the first surface operatively connected to the pair of charging contacts, such that in use, upon engaging the electronic game device with the first surface, the button is depressed, causing the pair of charging contacts to move to the extended position to engage corresponding charging ports on a peripheral edge of the electronic game device.

In another exemplary but nonlimiting aspect, there is provided a charging cradle for a portable, hand-held electronic game device having a base and a pivotably mounted cover, the base including a peripheral edge with a game card slot and a pair of charging ports located in a rearward portion of the peripheral edge, and game control buttons located at least at two rearward corners of the peripheral edge, the charging cradle comprising a cradle housing having an upper surface and a lower surface with a peripheral edge wall therebetween thereby forming an interior chamber, the upper surface adapted to support the electronic game device, the peripheral edge wall configured to limit movement of the electronic game device in at least forward and rearward directions relative to the cradle housing when the electronic game device is supported on the upper surface, while permitting user access to the game control buttons and the game card slot.

In still another exemplary aspect, there is provided a charging cradle for an electronic game device comprising a hollow housing including a surface for supporting the electronic game device; a pair of cradle contacts supported in the hollow housing and adapted to engage a pair of corresponding game device charging contacts in the electronic game device, the pair of cradle contacts enclosed within the hollow housing when the electronic game device is not supported on the surface; and means for extending the pair of cradle contacts out of the housing and into engagement with the pair of game device charging contacts when the electronic game device is loaded onto the support surface.

In still another aspect there is provided a combination electronic game device and charging cradle comprising an electronic game device having a base defined in part by a peripheral edge and a cover pivotally secured to the base for movement between closed and open positions, the peripheral edge provided in a rearward portion with a pair of charging ports, an AC adaptor connector, a game card slot and at least two additional recesses; the peripheral edge further provided with at least two game control buttons in opposite rearward corners of the peripheral edge; a charging cradle including a cradle housing having an upper surface and a lower surface with a peripheral edge wall therebetween thereby forming an interior chamber, the upper surface adapted to support the electronic game device, the peripheral edge wall configured to limit movement of the electronic game device in at least forward and rearward directions relative to said cradle housing when the electronic game device is supported on the upper surface, while permitting user access to the game control buttons and the game card slot.

The exemplary but nonlimiting embodiment will now be described in detail in connection with the drawings identified below.

BRIEF DESCRIPTION OF THE DRAWINGS

FIG. 1 is a top, right, front perspective view of a battery charger or cradle for a hand-held electronic game device in accordance with a first exemplary but nonlimiting embodiment;

FIG. 2 is a lower, left, rear perspective view of the battery charger device shown in FIG. 1;

DETAILED DESCRIPTION

Figure 3:
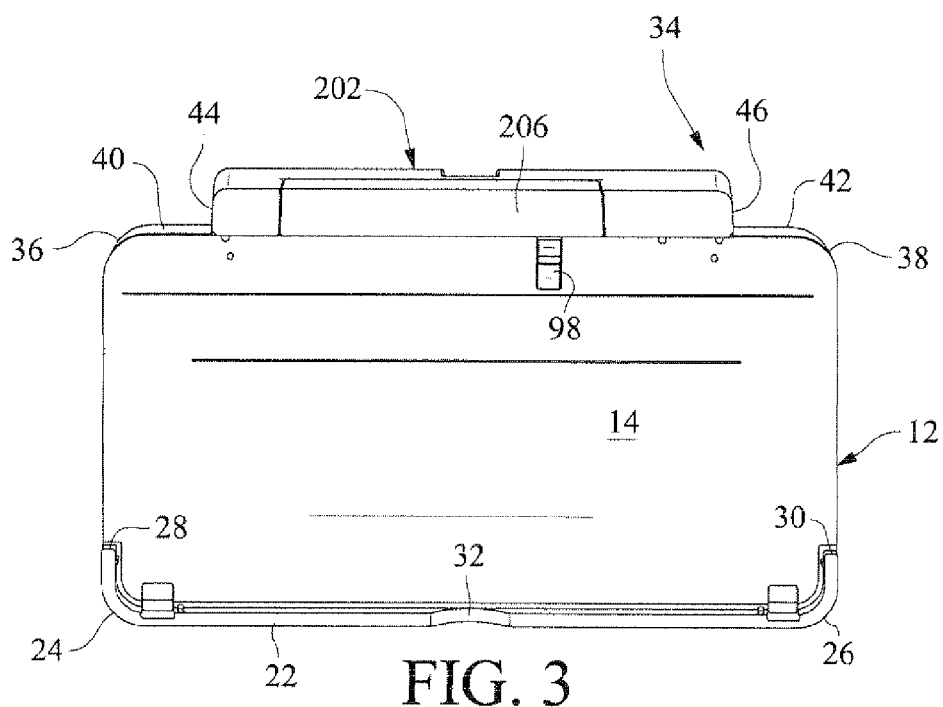
FIG. 3 is a top plan view of the battery charger shown in FIG. 1.
Figure 4:
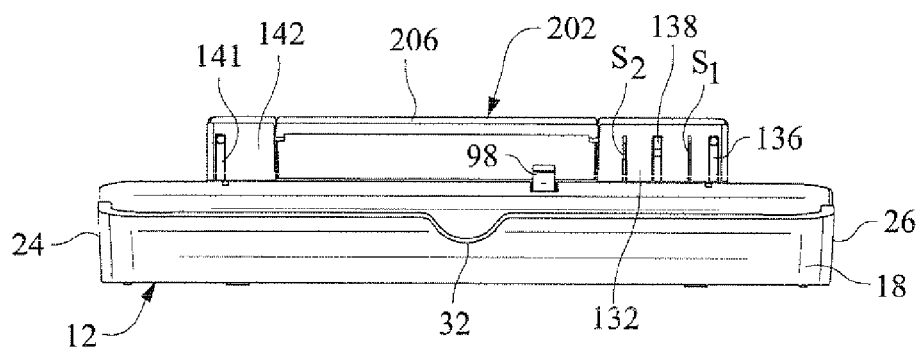
FIG. 4 is a front elevation of the battery charger shown in FIG. 1.
Figure 5:
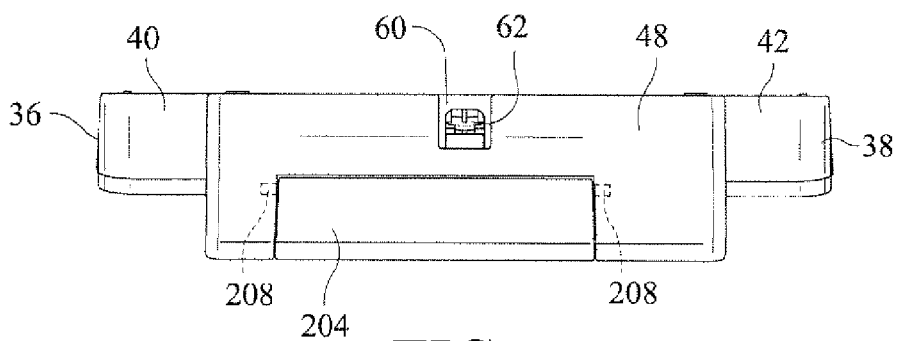
FIG. 5 is a rear elevation of the battery charger shown in FIG. 1.

With reference initially to FIGS. 1-6, an electronic game device battery charger, or cradle 10 includes a substantially hollow, two-piece cradle housing 12, which when assembled and oriented substantially horizontally, has an upper surface 14 and a lower surface 16 separated by a peripheral edge wall 18 that, in the exemplary embodiment, is formed integrally with the upper surface 14. The lower surface 16 comprises a flat plate 20 (see FIG. 6) attached by screws or other means as described further herein. The combined upper surface 14 and peripheral wall 18 may be considered a first or upper component of the cradle housing 12, while the plate 20 may be considered a second or lower component of the cradle housing 12. In the description of the charging cradle, reference is made with respect to "upper" and "lower" surfaces, presuming a horizontal orientation of the cradle. It will be understood, however, that the cradle itself could also be configured to rest vertically or at an acute angle relative to horizontal. In addition, references to "front" or "forward" and "back" or "rearward" are made consistent with an understanding of an electronic game device that has a "front" or "forward" edge that faces the user, and a "back" or "rearward edge" that faces away from the user.

The peripheral edge wall 18 and upper surface 14 are formed such that the upper surface 14 is slanted upwardly relative to horizontal, and relative to the lower surface 16 from the front of the cradle 10 indicated by the letter "F" toward the rear of the cradle indicated by the letter "R". Thus, the upper surface 14 is not parallel to the lower surface 16 but extends at an acute angle relative thereto as can be appreciated from FIG. 1.

The upper surface 14 serves as a support for an electronic game device (not shown in FIGS. 1-6, but see game device G in FIGS. 13, 14, and 18-21), noting that the length and width dimensions of the upper surface 14 approximate the length and width dimensions of the electronic game device. Accordingly, for a game device having a length of, for example, about 5.2 inches and a width of about 2.8 inches, the upper surface 14 will have similar length and width dimensions, but the width dimension of the upper surface (from front to back) is the more critical of the two, as explained further herein. The peripheral edge wall 18 is substantially flush with the lower surface 16 of the housing (see FIG. 2), so that the cradle 10 remains stable on any substantially flat horizontal surface.

The peripheral edge wall 18 is also substantially flush with the upper surface 14 except at the front and rear of the cradle. Specifically, at the front of the cradle, a portion 22 of the peripheral edge wall 18 extends above the upper surface 14. This upstanding edge portion 22 extends across the front F of the cradle 10 and through the forward corners 24, 26, terminating at vertical shoulders or steps 28, 30. A curved cut-out 32 in the center of the upstanding edge 22 facilitates removal of the game device from the cradle.

Figure 6:
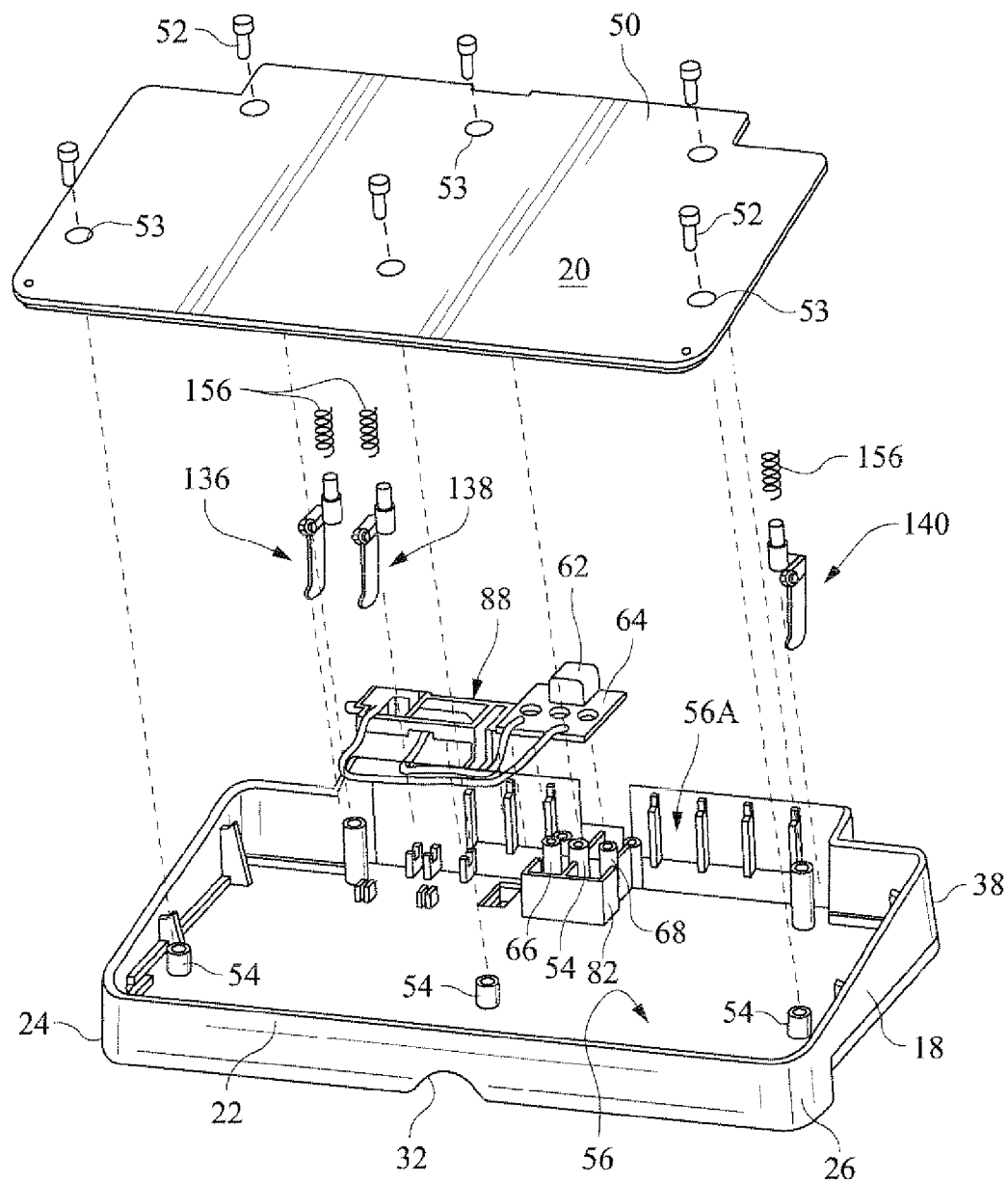
FIG. 6 is an exploded and inverted assembly view of the housing components of the battery charger shown in FIG. 1.
Figure 7:
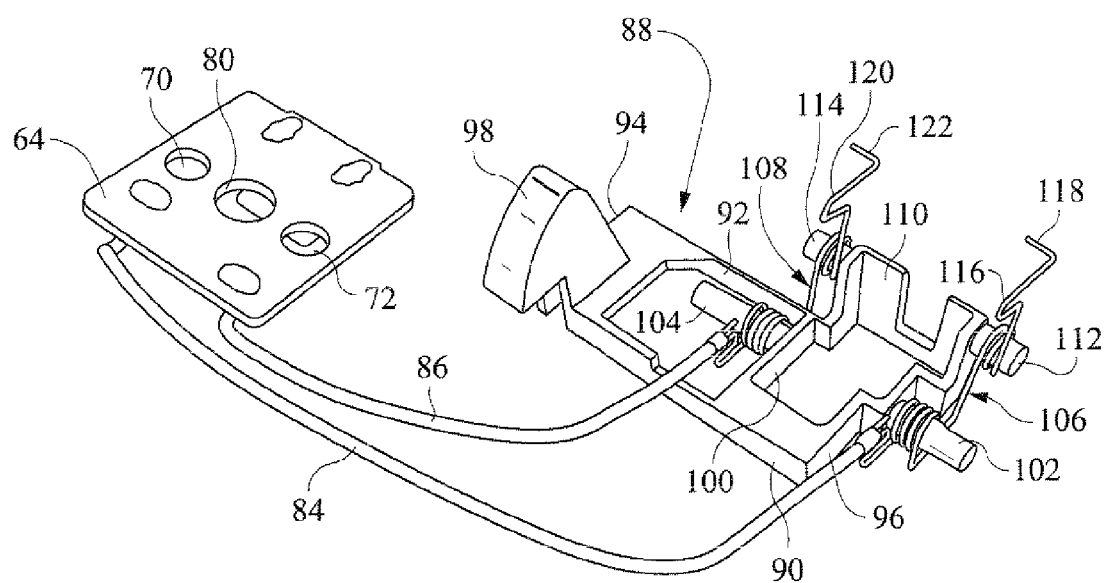
FIG. 7 is a perspective view of an internal frame assembly removed from the assembly view of FIG. 6 and inverted relative to its orientation in FIG. 6.

At the rear R of the cradle 10, the peripheral edge wall 18 is expanded rearwardly and vertically to form a "sub-housing" 34. The sub-housing 34 is located substantially centrally of the length of the cradle, such that the peripheral edge wall 18 remains flush with the upper surface 14 through the rearward corners 36, 38, providing a user benefit as described further herein. Thus, the sub-housing 34 extends rearwardly beyond the rear peripheral wall edge portions 40, 42 (see FIGS. 2 and 3) a distance defined by sub-housing side wall portions 44, 46 and extends laterally a distance defined by sub-housing rear wall portion 48. To accommodate the sub-housing 34, the plate 20 is formed with an extended portion 50 (FIGS. 2 and 6). In the exemplary embodiment, screws 52 (FIG. 6) may be inserted through holes 53 in the plate 20 and threaded into plural internal housing posts 54 to secure the flat plate 20 (or second housing component) to the upper surface/peripheral wall 14/18 (or first housing component).

Figure 8:
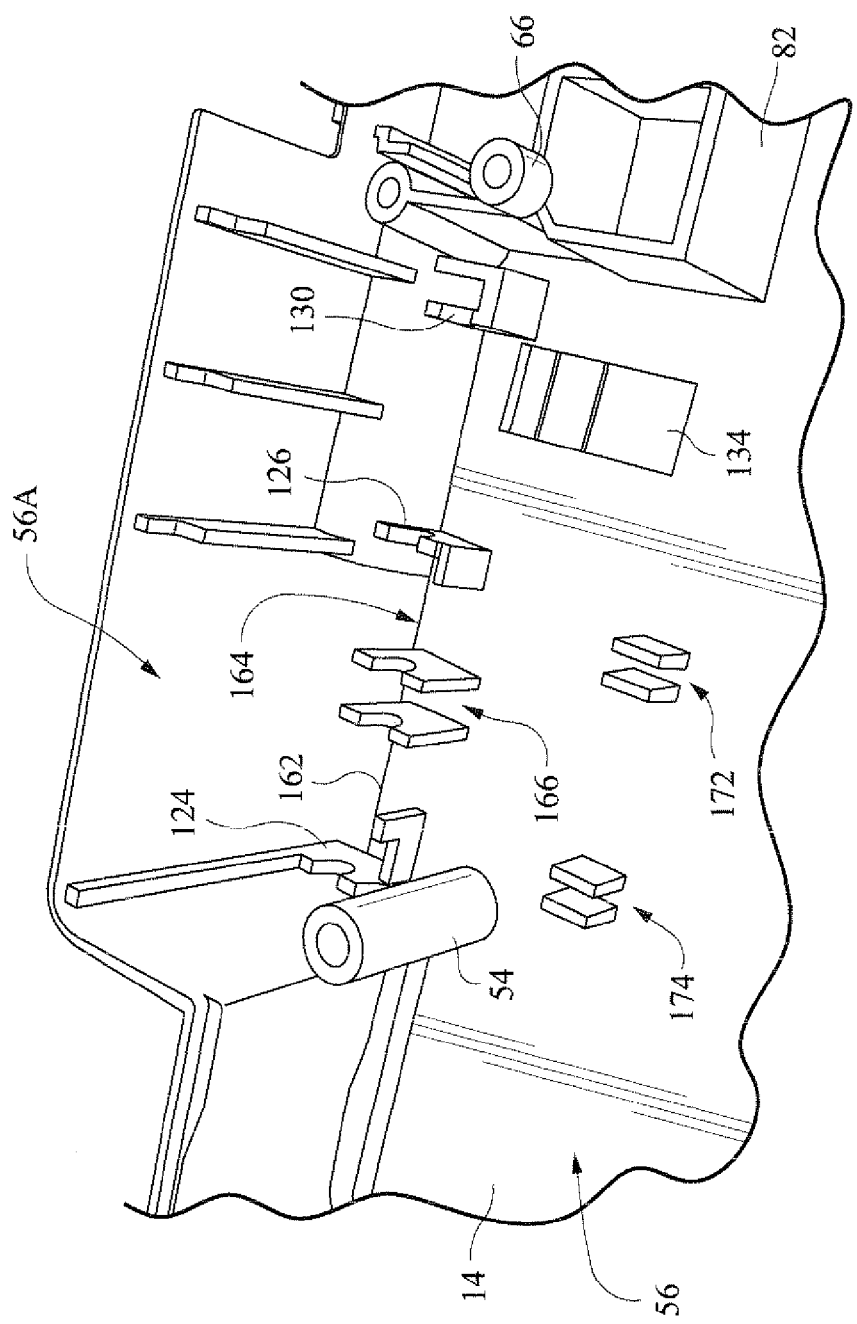
FIG. 8 is an enlarged detail of an interior portion of the battery charger or cradle housing shown in FIG. 6.

It will be appreciated that the cradle housing 12 provides a substantially closed interior chamber 56 that includes an expanded space 56A provided by the sub-housing 34 (see, for example, FIGS. 6 and 8).

The expanded space 56A in sub-housing 34, along with a part of the chamber 56 provide ample room for the internal cradle contacts and a port adapted to receive an AC adapter or charging wire connector 58. Specifically, the rear wall portion 48 of the sub-housing 34 is provided with an aperture 60 for accessing an otherwise conventional AC adaptor or proprietary connector port 62 (see FIGS. 2 and 5).

With reference now especially to FIGS. 6-10, the port 62 is mounted on an internal connector board 64. To locate and hold the board 64 in place, a pair of posts 66, 68 are employed on either side of one of the threaded posts 54 on the underside of upper surface 14. The posts 66, 68 are received in apertures 70, 72 in the board 64 while the middle, threaded post 54 projects through another aperture 80 in the board 64. To provide further support for the board 64, an internal substantially square support wall 82, which substantially matches the footprint of the board 64, is formed on the underside of the upper surface 14, so as to be engaged by the marginal edges of the board. This arrangement provides a rigid support for the board 64 and the port 62, effectively preventing any movement of the board and the port relative to the cradle housing 12. A pair of leads 84, 86 connected to the port 62 extend rearwardly from the board 64 and connect to a pair of cradle charging contacts as described further below (see FIG. 7).

A substantially flat, rectilinear frame 88 (also best seen in FIG. 7) is fixed to the underside of the upper surface 14 adjacent the board 64. The frame 88 includes front and rear walls 90, 92 and first and second end walls 94, 96. An upstanding actuator button 98 is integrally formed with end wall 94, and an additional or third wall 100 extends between the front and rear walls 90, 92. End wall 96 and third wall 100 support opposed, horizontal pivot pins 102, 104 which also serve as supports for springs 106, 108 as explained in further detail below. An upstanding frame tab 110 on an offset portion of the rear wall 92 supports a second pair of horizontal pins 112, 114 located above and offset from the pivot pins 102, 104 but extending substantially parallel thereto. The first spring 106 is wound about the pivot pin 102, extending rearwardly and under the wall 92, then extending vertically and wound around the pin 112. A remote or distal end of the spring 106 is bent into a wedge or arrow-shaped portion 116 (see, for example, FIGS. 12, 15A and 15B), and terminates at a transverse free edge 118. Similarly, the second spring 108 is wound about the pivot pin 104 and pin 114, with the distal end of the spring 108 bent into a wedge or arrow-shaped portion 120, terminating at a transverse free edge 122. Leads 84, 86 are joined to the springs 106, 108 at the pivot pins 102, 104, respectively. The wedge or arrow-shaped portions 116, 120 of the springs 106,108 serve as the cradle charging contacts, and they are moveable as the frame 88 pivots in response to depression of the button 98 as described further herein.

Figure 9:
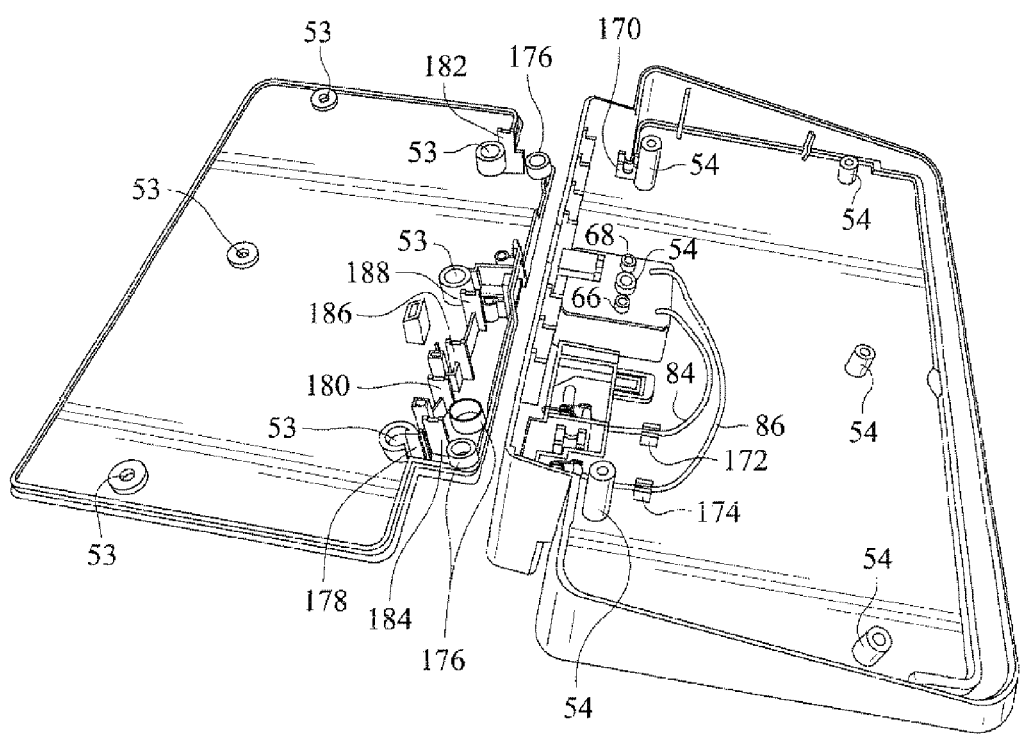
FIG. 9 is an assembly view of the battery charger housing components from a different perspective, and with the electronic game device installed.
Figure 10:
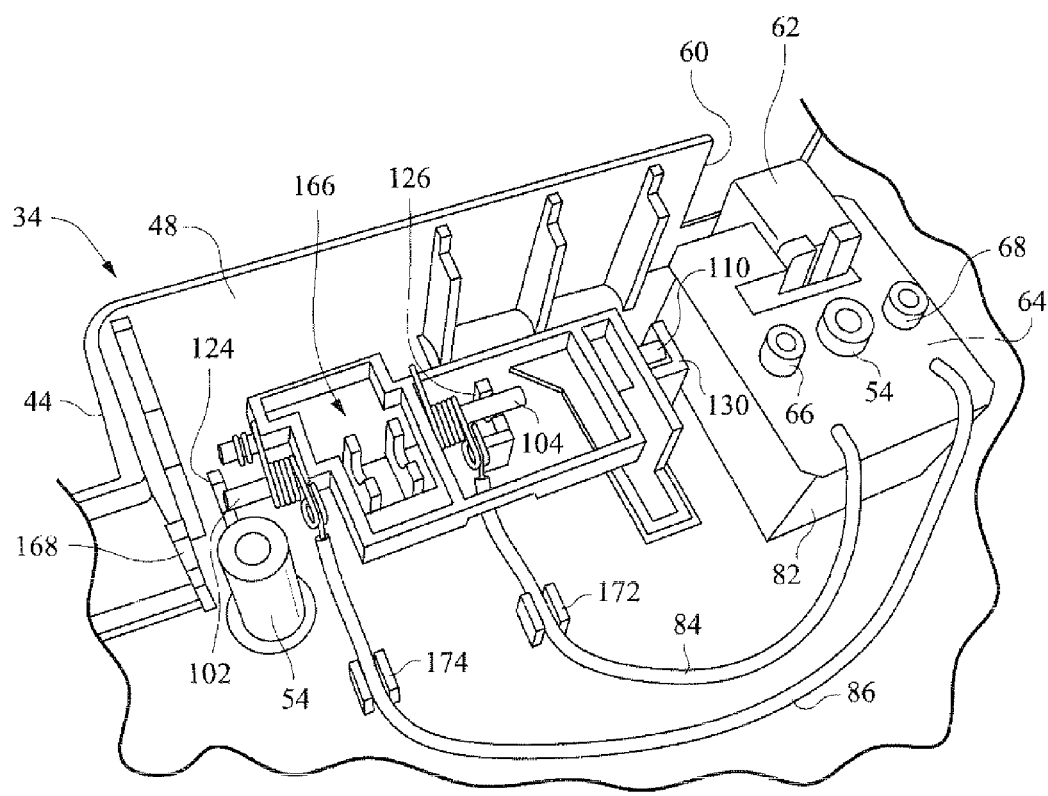
FIG. 10 is an enlarged and reoriented detail taken from FIG. 9.

With particular reference now to FIGS. 8-10, it may be seen that when the frame 88 is mounted in the interior of the cradle housing 12, pivot pins 102, 104 are seated in fixed bearings 124, 126, respectively, on the underside of upper surface 14. Note also a third pivot pin 128, axially aligned with pivot pins 102, 104 and extending from the frame end wall 94 (extending away from the button 98) is seated in a third fixed bearing 130 (FIG. 10). On assembly, the charging contacts 116 and 120 are located in the upper portion of the sub-housing 34, aligned with contact slots S1 and S2 provided in a forward wall portion 132 of the sub-housing 34, and the button 98 projects through an opening 134 formed in the top surface 14 (see, e.g., FIGS. 1, 4, 11, 12, 13).

Figure 11:
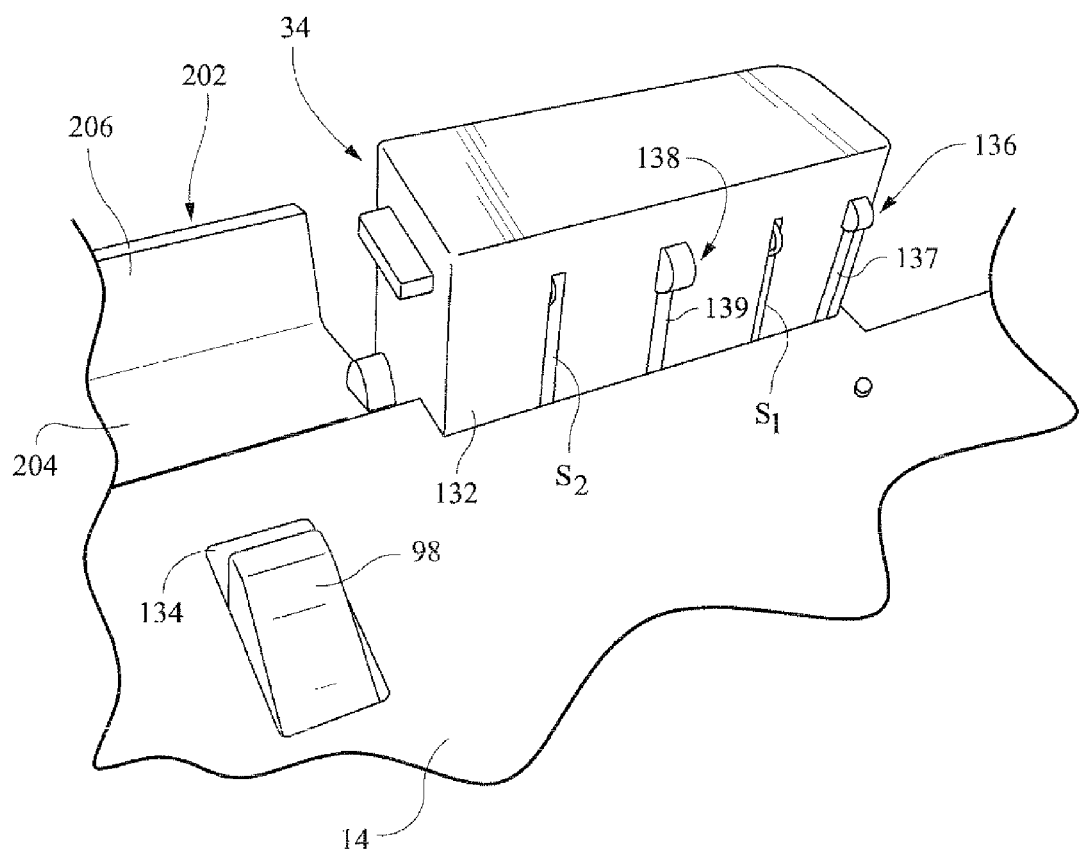
FIG. 11 is an enlarged and reoriented detail taken from FIG. 1.
Figure 12:
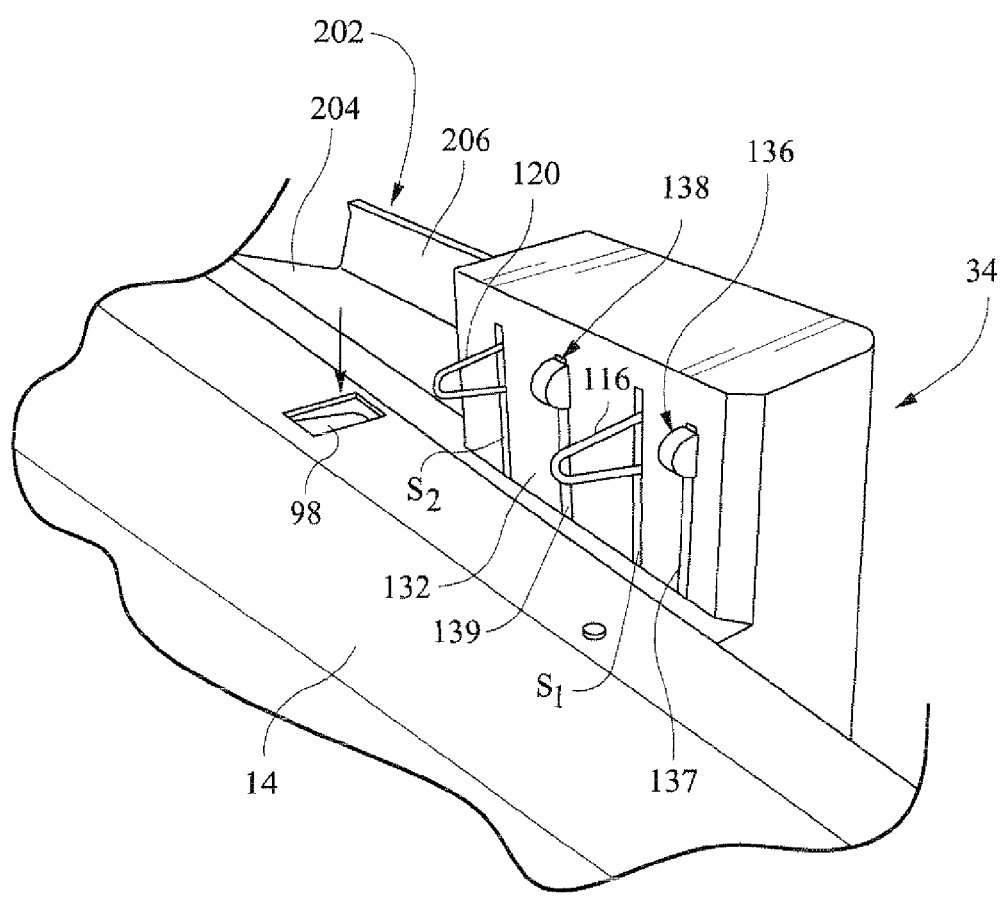
FIG. 12 is similar to FIG. 11 but reoriented, and showing the battery charger contacts in an extended position.
Figure 13:
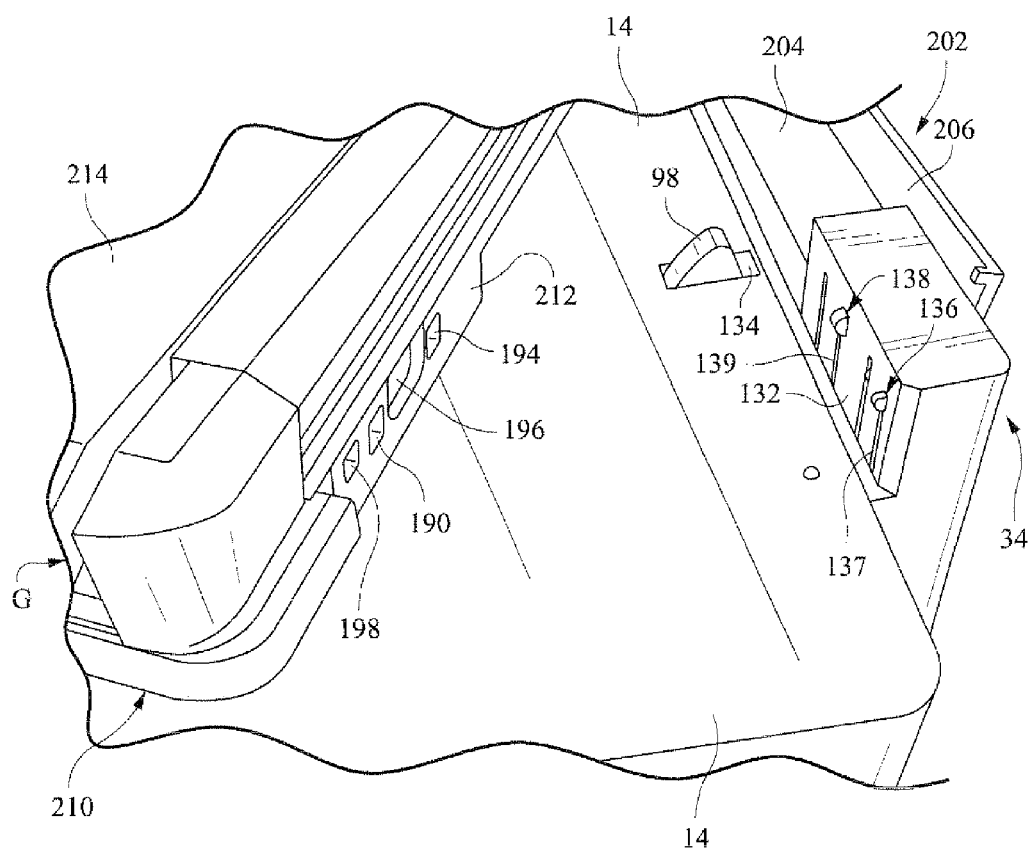
FIG. 13 is a partial perspective illustrating an electronic game device supported on the battery charger but prior to full engagement.
Figure 14:
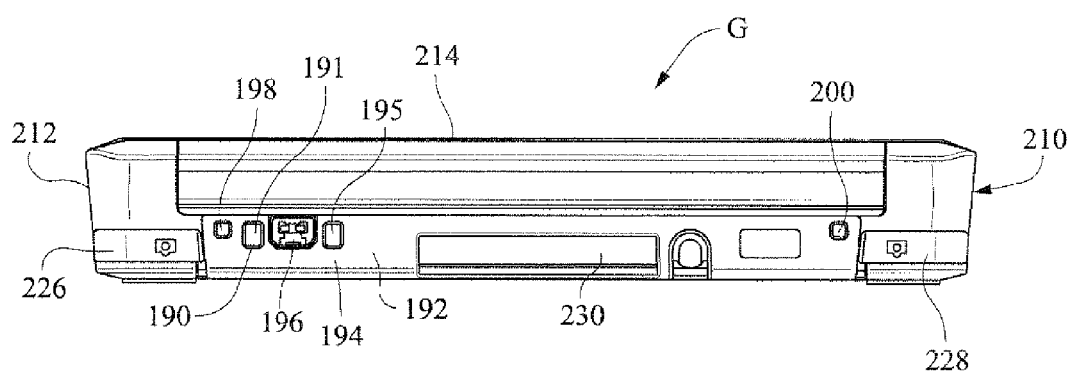
FIG. 14 is a rear elevation of an electronic game device used with the battery charger shown in FIG. 1.
Figure 16:
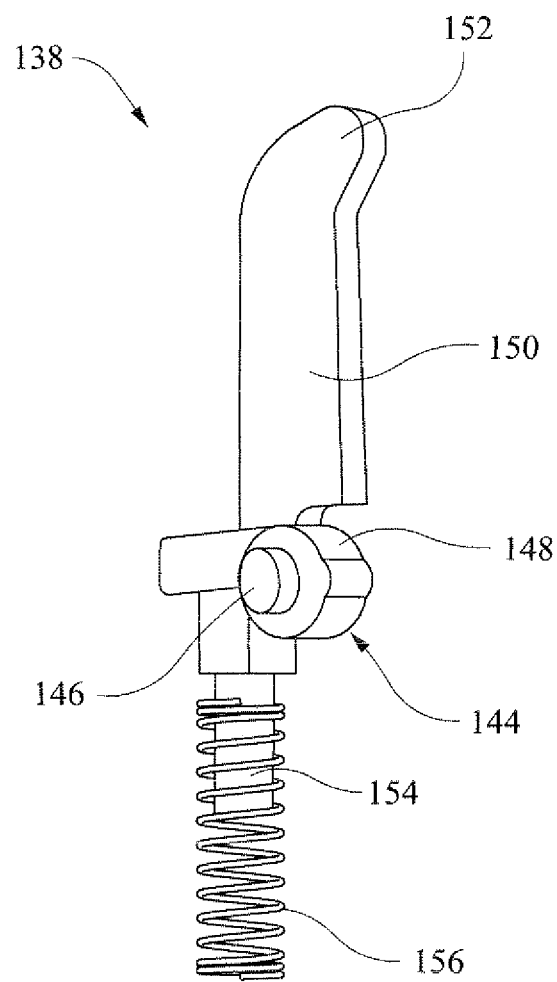
FIG. 16 is a perspective view of a game device locator arm used to locate and hold the electronic game device upon onto the battery charger.

Also located within the sub-housing 34 are plural (three in the exemplary embodiment) game device locators which aid in the proper alignment of the game device G on the charging cradle 10. The three game locators 136, 138 and 140 are located along the forward wall portion 132 at one end of the sub-housing 34 and another forward wall portion 142 at an opposite end of the sub-housing. The three locators 136, 138 and 140 can be seen in FIGS. 1, 4 and 6, while locators 138, 140 are also seen in FIGS. 11, 12 and 13. The locators are substantially identical (or substantial mirror images), and, therefore, only one will be described in detail. As best seen in FIG. 16, the game locator 138, which is supported in the sub-housing 34 in a generally upright, vertical orientation, is a one-piece component formed to include a horizontally oriented, double-pivot block 144 having a pair of transversely-oriented coaxial pins 146 (one shown in FIG. 16) on either side of a center boss 148. The block 144 is offset laterally from a locating arm 150 extending above the block 144 and having an angled tip 152. A post 154 extends in an opposite direction from the block 144 and provides a receptor for a coil spring 156.

FIG. 6 illustrates generally the assembly of the component parts, and shows the orientation and position of the game locators 136, 138 and 140 and associated coil springs 158, 156 and 160, respectively, noting that the cradle 10 in FIG. 6 is inverted relative to its normal in-use orientation. In FIG. 8, it can be seen that the edge 162 of the surface 14 does not extend to the peripheral edge wall 18 in the area of the sub-housing 34, thus leaving space for insertion of the game locators (as oriented in FIG. 6) in a direction indicated by arrow 164 (FIG. 8), such that, for example, the locating arm 150 of locator 138 will be aligned with a corresponding locator slot 139 in the forward wall portion 132, and with the double-pivot block 144 supported by the double-bearing 166 (FIG. 8). Similar support arrangements are provided for each of the remaining two game locators 136 and 140. A double bearing for locator 136 is partially shown at 168 in FIG. 10, while the double bearing 170 for locator 140 is visible in FIG. 9.

After locating the board 64 and frame 88 on the underside 104 of surface 14, and with leads 84, 86 held in guide tab pairs 172, 174, the plate 20 is secured to the first housing component 14/18 by means of the screws 52 inserted through the holes 53 in plate 20 and threaded into the various internal, threaded posts 54.

With specific reference to FIG. 9, when the plate 20 is assembled to the upper component of the housing 12, the coil springs 158, 156 and 160 will be supported in substantially identical cylindrical spring receptors 176 (FIG. 9) on the underside of the plate 20, noting that the posts 154 locate the springs but do not otherwise support the locators. The locators 136, 138 and 140 are held in their respective bearings 168, 166 and 170 by mating standards 178, 180 and 182 on the underside of the plate 20, and the pivot pins 102, 104 and 128 of the frame 88 are held in their respective bearings by mating standards 184, 186 and 188 also projecting from the underside of the plate 20 (see FIG. 9). Thus, upon assembly, all internal components are fixed in place within the cradle housing 12, understanding, however, that the charging contacts 116, 120 and the game device locators 136, 138 and 140 are able to pivot in response to loading and unloading the game device G relative to the cradle 10.

When the cradle 10 is empty, the tips 152 of locators 136, 138 and 140 project from their respective locator slots 137, 139 and 141 in the front wall portions 132 and 142 of the sub-housing 34 as shown in FIGS. 1 and 11-13. At the same time, the cradle charging contacts 116 and 120 are located so as to be substantially flush with (or slightly behind) contact slots S1 and S2 (see FIG. 11 and FIG. 13) so that when not in use, the charging contacts are protected from damage due to, for example, unintended impacts.

Figure 15A:
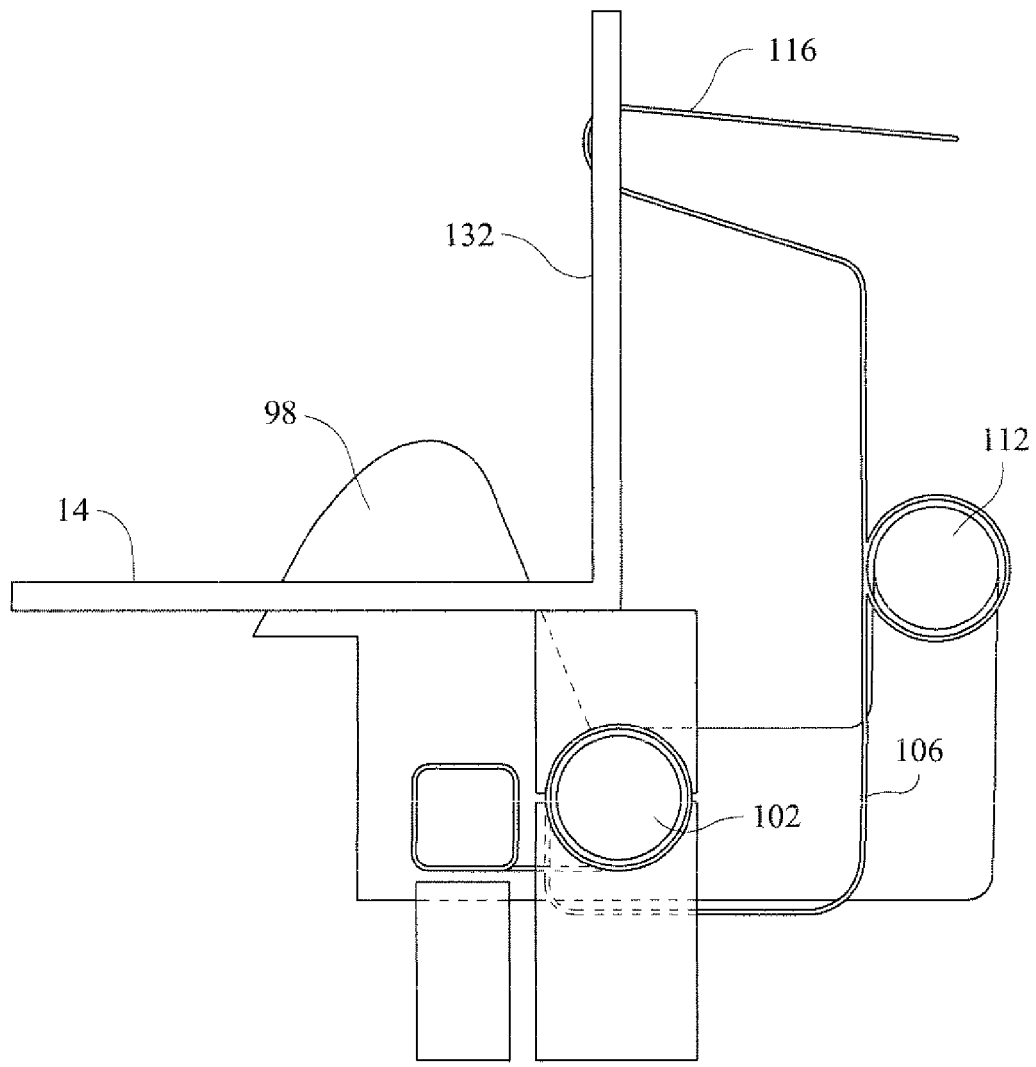
FIGS. 15A and 15B show schematically and sequentially the manner in which electrical connection is established between the battery charger and the electronic game device upon loading the game device onto the battery charger.
Figure 15B:
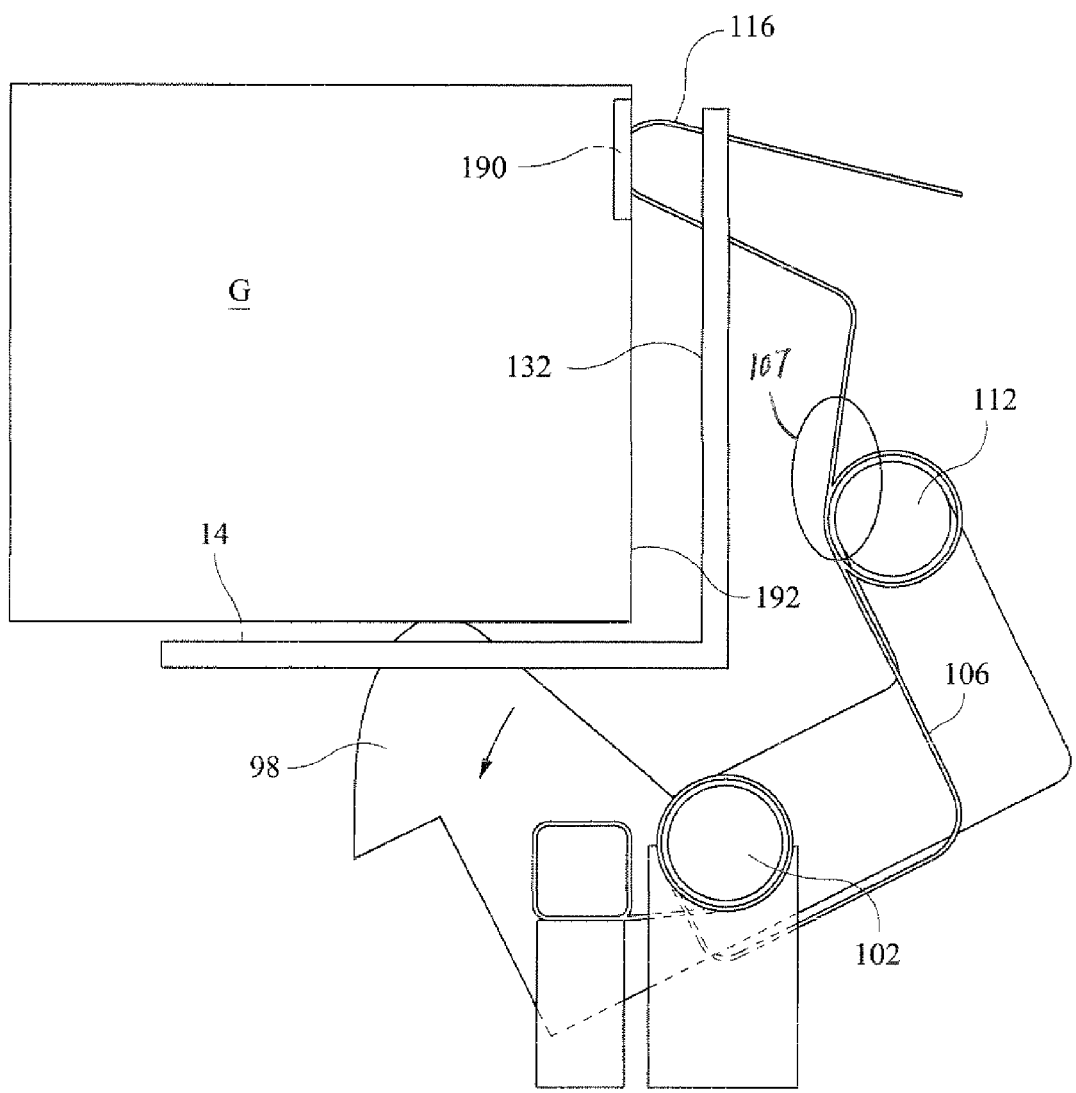

With the aid of schematic drawings shown in FIGS. 15A and 15B, the manner of operation of the actuator button 98 may be more easily understood. FIG. 15A shows the button 98 in its normal state, projecting above the upper surface 14 of the cradle, and with the cradle charging contact 116 retracted so as to be substantially flush with the wall portion 132 of the sub-housing 34. The manner in which the spring 106 is wound about the pin 112 and pivot pin 102 cause the frame 88 and button 98 to be biased in a clockwise direction to the normal, non-use state shown in FIG. 15A. When the button 98 is depressed upon loading the game device G onto the cradle upper surface 14 as shown in FIG. 15B, the frame 88 and button 98 rotate in a counterclockwise direction (relative to the orientation in FIG. 15A), causing the cradle charging contact 116 to project outwardly from the slot S1 and into the game device charging port 190 on the rear peripheral edge 192 of the game device G (see FIGS. 13 and 14) where it engages a stationary, flat game device charging contact 191 (see FIG. 14). After charging is completed, as the game device G is removed from the cradle 10, the frame 88 will rotate in the opposite direction, withdrawing the cradle charging contact 116 from the game device charging port 190 and returning to the normal state shown in FIG. 15A. In this regard, note that when the cradle charging contact 116 is extended, the spring 106 is distorted (see the encircled area 107 in FIG. 15B), thus creating a bias that assists in returning the contact 116 to the retracted position. While the above description focuses on the cradle charging contact 116, it will be understood that the second cradle charging contact 120 moves simultaneously and in exactly the same manner as the cradle charging contact 116, moving into the out of engagement with the second charging contact 195 (see FIG. 14) in the port 194. It will be appreciated that the specific cradle contact configuration and the manner of interconnection with the frame 88 and the actuator button 98, which results in the automatic engagement of cradle contacts with game device contacts, may vary to include equivalent structures known to those of ordinary skill in the art.

Figure 17A:
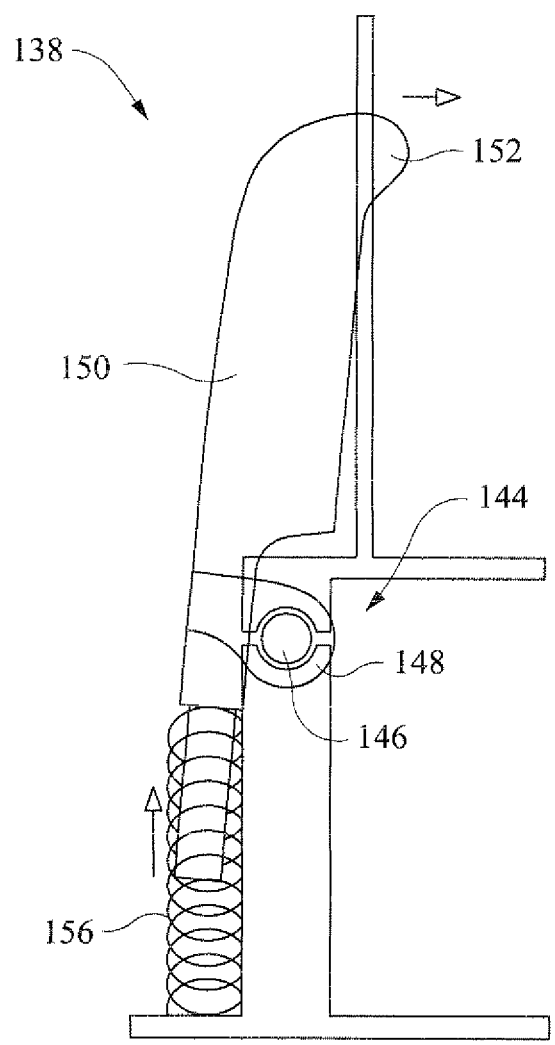
FIGS. 17A-C show schematically and sequentially the manner in which the locator shown in FIG. 16 is engaged between the battery charger and the electronic game device upon loading the game device onto the battery charger.

Now considering just the locator 138, and with reference to the partially schematic representation in FIG. 17A, the pivot and spring mounting of the game locator 138 causes the locating arm 150 to be biased in a clockwise direction, so that upon assembly, the tip 152 of the locating arm projects outwardly from its respective locator slot 139 in the wall portion 132. Thus, FIG. 17A shows the game locator 138 in its normal position, before a game device G is loaded onto the cradle 10.

Figure 17B:
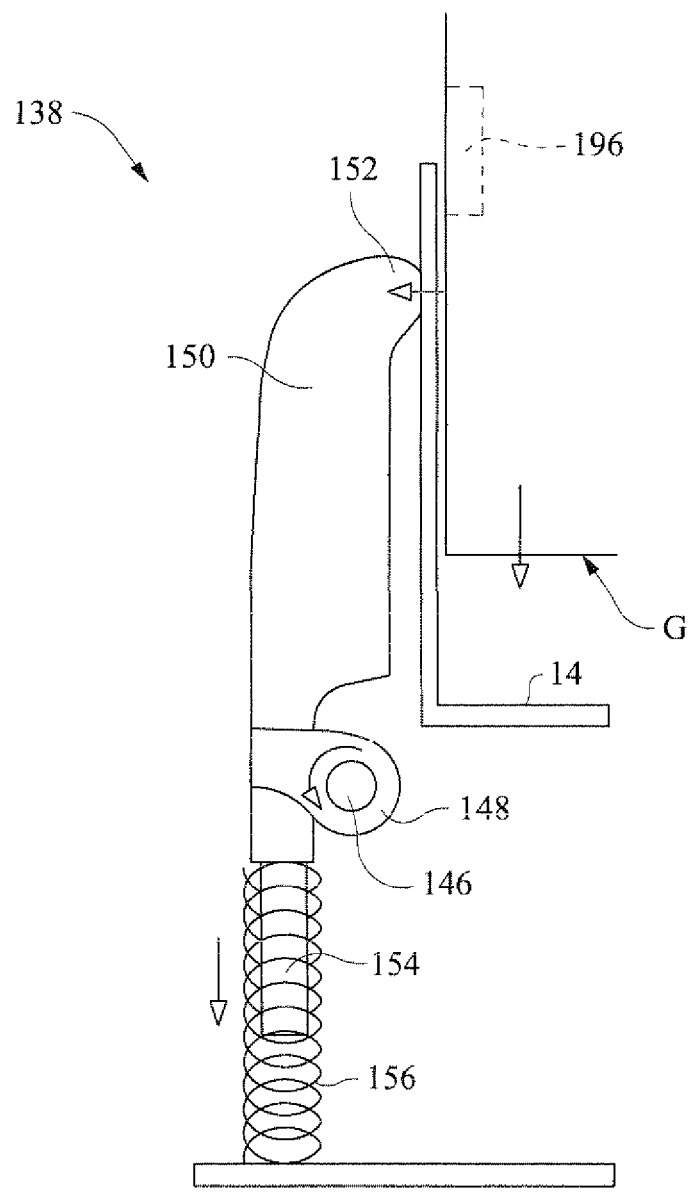
Figure 17C:
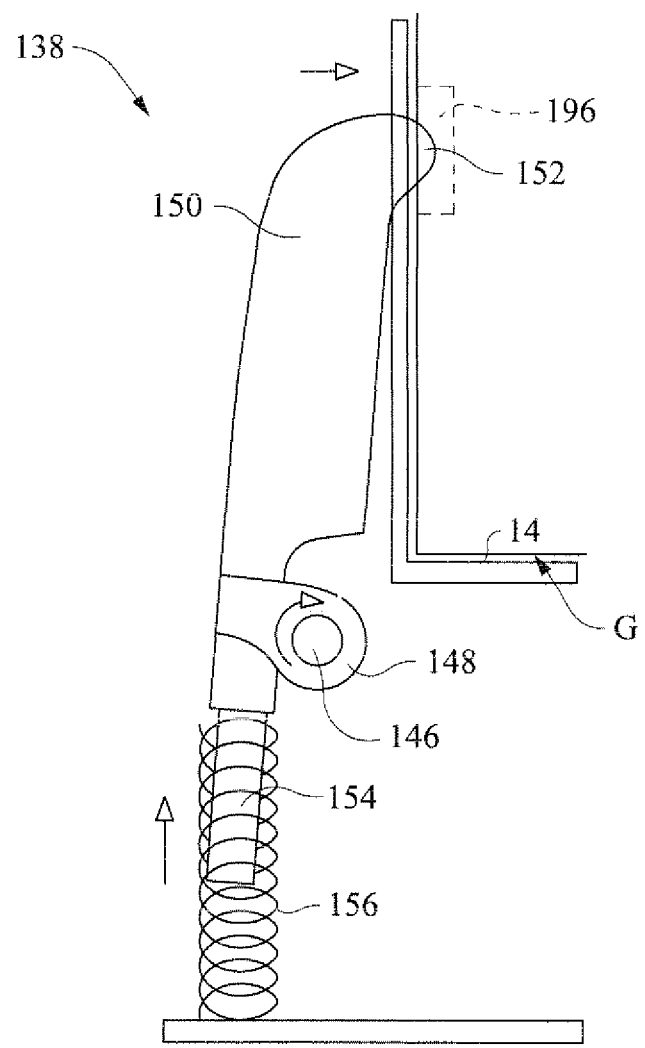
Figure 18:
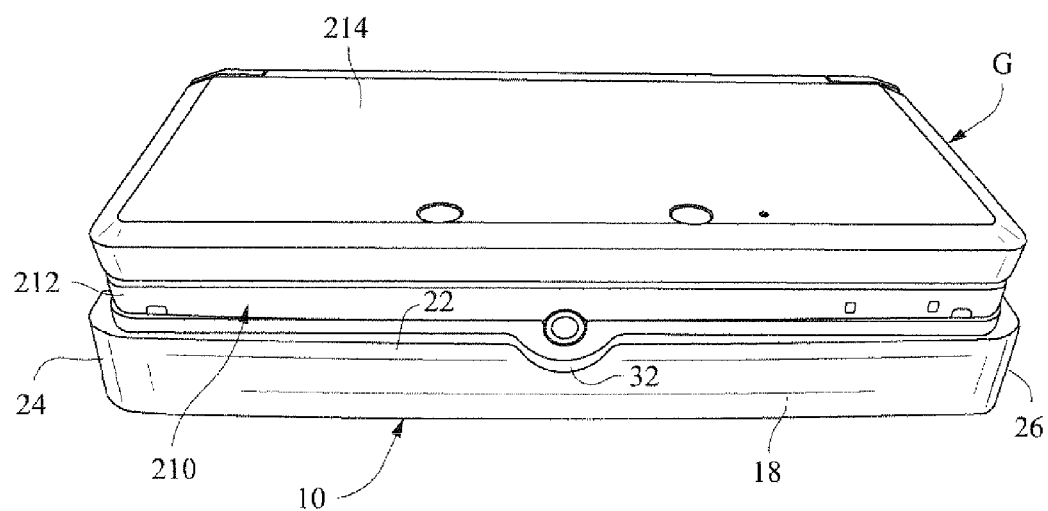
FIG. 18 is a front perspective view of an electronic game device loaded onto the battery charger.

FIG. 17B shows how the game locator 138 is pivoted counterclockwise as the game device G is loaded onto the cradle, and FIG. 17C shows the game device locator 138 biased again in a clockwise direction with the tip 152 of the locator arm 150 engaged within a recess 196 (shown in phantom) provided in the game device G. The remaining two game device locators 136 and 140 operate in an identical manner, cooperating with two other recesses 198, 200 (FIG. 14) provided in the game device G as described further below.

With reference again to, for example, FIGS. 1-5, 11, 13, 14 and 18-21, it is another feature of the exemplary but nonlimiting embodiment that an upper center portion of the sub-housing 34 comprises an openable panel 202 including a rearward wall 204 and an top wall 206 that extends in a forward direction. The panel 202 is pivotally mounted to the sub-housing rear wall portion 148 by means of pins 208 (shown in phantom in FIG. 5). From the closed position shown in FIGS. 1-5 and 14, the panel 202 may be pivoted to an open position, partially shown in FIGS. 11-13 and 20 to thereby expose a portion of the rear peripheral edge 192 of the game device G.

Figure 19:
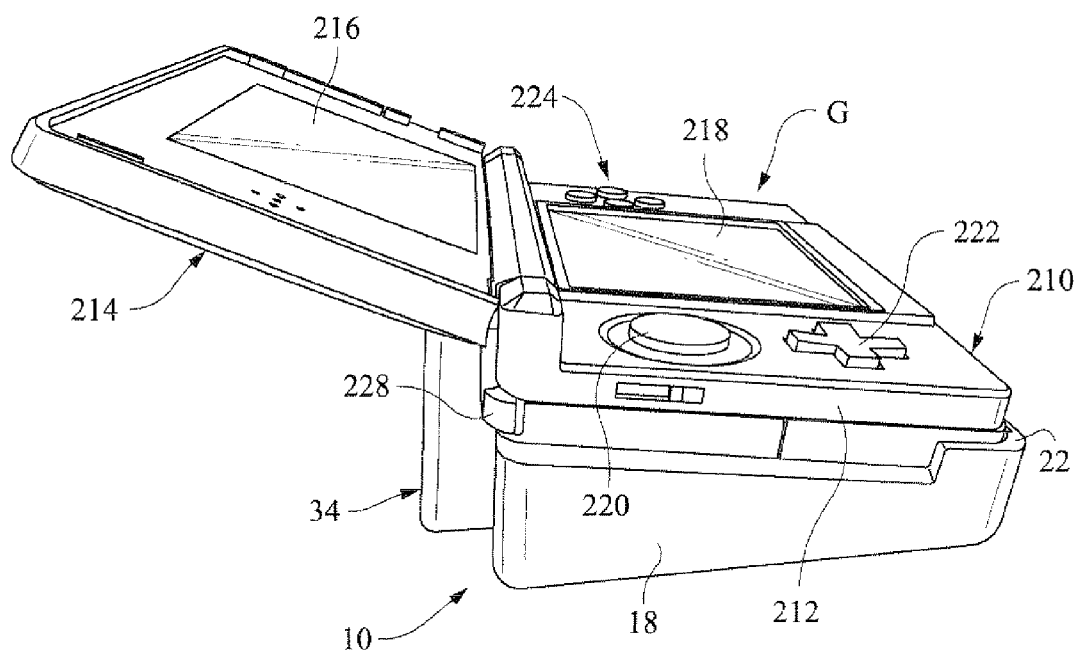
FIG. 19 is a side perspective view of an electronic game device in the open position, loaded onto the battery charger.
Figure 20:
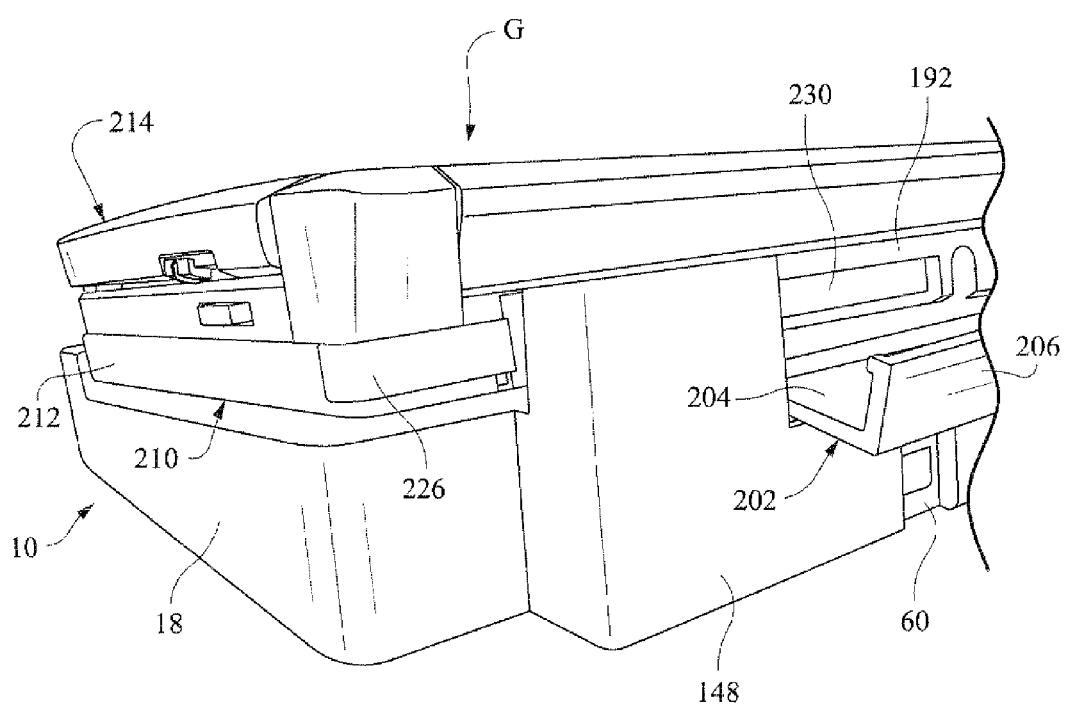
FIG. 20 is a partial rear perspective view of the electronic game device loaded onto the battery charger.

FIGS. 13, 14 and 18-20 provide additional details with respect to the interaction between the cradle 10 and an actual game device G. In the nonlimiting example described herein, the game device G includes a base 210 surrounded by the peripheral edge 212 that merges with the rear peripheral edge 192; and a cover 214 pivotally mounted to the base. When the cover 204 is open as shown in FIG. 19, dual screens 216, 218 and game control buttons 220, 222 and 224 are visible. The rearward portion of the peripheral edge 192 (best seen in FIGS. 13, 14 and 20) is provided with the pair of game device charging ports 190, 194, recesses 198, 196 and 200 and a game card slot 230. In the exemplary embodiment, the recess 196 is an AC adaptor port. Thus, when the game device G is loaded onto the cradle upper surface 14, cradle charging contacts 116, 120 engage within game device charging ports 190, 194; locators 136 and 140 engage within recesses 198, 200 and locator 138 engages the AC adaptor port or recess 196. The locator 138 may be configured so have a larger tip portion to more effectively engage the AC adaptor port 196. In this regard, the locator 138 may also serve as a stop, taking up any slack between the game device G and the forward edge 22 of the peripheral edge wall 18, thus preventing any shifting in a front-to-back (or vice versa) direction. The remaining locators 136 and 140 within the smaller recesses 198, 200 locate the game device G and also limit side-to-side movement of the game device. Thus, the forward curved corner portions 24, 26 of the upstanding edge 22 combined with the locators 136, 138 and 140 provide effective means for locating and holding the game device G on the cradle housing in each of two mutually perpendicular directions (front-to-back, and side-to-side). Locating and holding the game G in this manner is important so that effective but not excessive pressure is maintained between the game device charging contacts 191, 195 and the cradle charging contacts 116, 120.

FIG. 19 illustrates that the game device G may be loaded onto the cradle 10, and the game cover 204 pivoted to an open position. Note that because of the lowered height of the peripheral wall 18 between the shoulders 28, 30 and the sub-housing side walls 44, 46, the game corner buttons 226, 228, etc. are left exposed. As a result, the user has the ability to fully operate the game device G while the game device is being charged. Opening the panel 202 also exposes the game card slot 230 and thus allows the user to exchange game cards while the game device is being charged. Note also that when the game device G is loaded onto the cradle 10, the sub-housing 34 blocks access to the game device AC adaptor port 196 so that only the AC adaptor port 62 on the cradle is available to the user.

It will be appreciated that the shape of the locator arms, the shape of the cradle spring contacts, and the type of connectors utilized, may vary as desired.

Accordingly, while the exemplary embodiment has been described and illustrated in detail, it is clearly understood that the same is by way of illustration and nonlimiting example only, the spirit and scope of the present invention being limited only by the terms of the appended claims.

What is claimed is:

1. A charging cradle for an electronic game device incorporating a rechargeable battery comprising:
    a housing having a first surface and a second surface with a peripheral edge wall therebetween, said housing forming a substantially closed interior chamber, said first surface adapted to engage the electronic game device;
    at least one port in said peripheral edge wall adapted to receive a charging wire connector, said port electrically connected to a pair of charging contacts supported within said substantially closed interior chamber and movable from a normal retracted position where tips of said charging contacts are inside said housing to an in-use extended position where said tips project from said housing; and
    an actuator button on said first surface operatively connected to said pair of charging contacts, such that in use, upon engaging the electronic game device with said first surface, said button is depressed, causing said pair of charging contacts to move to said extended position to engage corresponding charging ports on a peripheral edge of the electronic game device; and wherein said first surface comprises an upper surface, and said second surface comprises a lower surface, said upper surface sloping upwardly in a front-to-back direction.

2. The charging cradle of claim 1 wherein at least a forward edge of said peripheral edge wall extends above said upper surface.

3. The charging cradle of claim 1 wherein said pair of charging contacts are adapted to project through respective contact slots formed in a front wall of a sub-housing at a rearward end of said housing, wherein said sub-housing expands said substantially closed interior chamber.

4. The charging cradle of claim 3 including at least one locator biased to a normal extended position where a tip of said at least one locator projects from said front wall of said sub-housing, said at least one locator adapted to engage within a recess on the peripheral edge of the electronic game device.

5. The charging cradle of claim 4 wherein said at least one locator is between said pair of charging contacts and said recess comprises an AC adaptor port.

6. The charging cradle of claim 3 wherein said sub-housing includes a pivotable panel that, when open, permits access to a game card slot in the peripheral edge of the game device.

7. The charging cradle of claim 1 wherein said button and said charging contacts are attached to a frame pivotally supported within said substantially closed interior chamber, and said port is supported on a fixed, internal wall adjacent said frame; and wherein a pair of lead wires extend from said port to said charging contacts.

8. A charging cradle for a portable, hand-held electronic game device having a base having a peripheral edge provided with a game card slot and a pair of charging ports located in a rearward portion of the peripheral edge, and with game control buttons located at least at two rearward corners of the peripheral edge, the charging cradle comprising:
a cradle housing having an upper surface and a lower surface with a peripheral edge wall therebetween thereby forming an interior chamber, said upper surface adapted to support the electronic game device, said peripheral edge wall configured to limit movement of the electronic game device in at least forward and rearward directions relative to the cradle housing when the electronic game device is supported on said upper surface, while permitting user access to the game control buttons and the game card slot; and a pair of charging contacts adapted to engage within said charging ports when the electronic game device is loaded onto said upper surface.

9. The charging cradle of claim 8 wherein the electronic game device has a pivotally mounted cover, said cradle housing peripheral edge wall configured to allow the pivotably mounted cover to be opened when the electronic game device is loaded onto said upper surface so that a user can operate the electronic game device when it is loaded onto said upper surface.

10. The charging cradle of claim 8 wherein said pair of charging contacts is supported within said interior chamber and movable from a normal retracted position where tips of said charging contacts are substantially flush with said cradle housing to an in-use extended position where said tips project from said cradle housing, said charging cradle further comprising a port in said peripheral edge wall electrically connected to said charging contacts.

11. The charging cradle of claim 10 further comprising an actuator button on said upper surface operatively connected to said pair of charging contacts, such that in use, upon engaging the electronic game device with said upper surface, said button is depressed, causing said pair of charging contacts to move to said extended position so as to engage the pair of charging ports on the peripheral edge of the electronic game device.

12. The charging cradle of claim 11 wherein said pair of charging contacts are adapted to project through respective contact slots formed in a front wall of a sub-housing at a rearward end of said cradle housing.

13. The charging cradle of claim 12 including at least one locator biased to a normal extended position where a tip of said at least one locator projects from said front wall of said sub-housing, said at least one locator adapted to engage a recess on the peripheral edge of the electronic game device.

14. The charging cradle of claim 13 wherein said at least one locator is between said pair of charging contacts and said recess comprises an AC adaptor port.

15. The charging cradle of claim 12 wherein said sub-housing includes a pivotable panel that, when open, permits access to a game card slot in the peripheral edge of the game device.

16. The charging cradle of claim 12 wherein said button and said charging contacts form part of a frame pivotally supported within said cradle housing, said port supported on a fixed, internal wall adjacent said frame, and wherein a pair of lead wires extend from said port to said charging contacts.

17. The charging cradle of claim 8 wherein, when said cradle housing is oriented substantially horizontally, said peripheral edge wall extends above said upper surface at a forward end of said cradle housing, and forms part of a sub-housing that extends above said upper surface at a rearward end of said cradle housing.

18. The charging cradle of claim 17 wherein rearward corners of said cradle housing adjacent said sub-housing are substantially flush with said upper surface.

19. A charging cradle for an electronic game device comprising:
a hollow housing including a surface for supporting the electronic game device;
a pair of cradle contacts supported in said hollow housing and adapted to engage a pair of corresponding game device charging contacts in the electronic game device, said pair of cradle contacts enclosed within said hollow housing when the electronic game device is not supported on said surface; and
means for extending said pair of cradle contacts out of said housing and into engagement with said pair of game device charging contacts when said electronic game device is loaded onto said support surface; and wherein the electronic game device is formed with a peripheral edge, the pair of charging contacts and a game card slot located on a rearward portion of the peripheral edge, the charging cradle further comprising means for permitting access to the game card slot when the electronic game device is supported on said surface.

20. The charging cradle of claim 19 and further comprising means for locating the electronic game device on said surface and for limiting movement of the electronic game device in two substantially mutually perpendicular directions.

21. A combination electronic game device and charging cradle comprising:
an electronic game device having a base defined in part by a peripheral edge, said peripheral edge provided in a rearward portion with a game card slot and at least one recess; said peripheral edge further provided with at least two game control buttons in opposite rearward corners of said peripheral edge;
a charging cradle including a cradle housing having an upper surface and a lower surface with a peripheral edge wall therebetween thereby forming an interior chamber, said upper surface adapted to support said electronic game device, said peripheral edge wall configured to limit movement of said electronic game device in at least forward and rearward directions relative to said cradle housing when said electronic game device is supported on said upper surface, while permitting user access to said game control buttons and said game card slot.

22. The combination electronic game device and charging cradle of claim 21 wherein said peripheral edge of said electronic game device is provided with a pair of game device charging ports; said cradle housing further comprising at least one port in said peripheral edge wall electrically connected to a pair of charging contacts supported within said interior chamber and movable from a normal retracted position where tips of said charging contacts are inside said cradle housing to an in-use extended position where said tips project from said cradle housing and engage game device charging contacts within said game device charging ports.

23. The combination electronic game device and charging cradle of claim 22 and further comprising an actuator button on said upper surface operatively connected to said pair of charging contacts, such that in use, upon loading the electronic game device on said upper surface, said button is depressed, causing said pair of charging contacts to move to said extended position.

24. The combination electronic game device and charging cradle of claim 23 wherein said pair of charging contacts are adapted to project through respective contact slots formed in a front wall of a sub-housing at a rearward end of said cradle housing.

25. The combination electronic game device and charging cradle of claim 24 including at least one locator biased to a normal extended position where a tip of said at least one locator projects from said front wall of said sub-housing, said at least one locator adapted to engage said at least one recess in said peripheral edge of said electronic game device.

26. The combination electronic game device and charging cradle of claim 25 wherein said at least one recess comprises an AC adapter port.

27. The combination electronic game device and charging cradle of claim 21 wherein user access to said game card slot is provided by a pivotable panel on said sub-housing moveable between open and closed positions.

28. The combination electronic game device and charging cradle of claim 21 wherein the electronic game device has a pivotally mounted cover, said cradle housing peripheral edge wall configured to allow the pivotably mounted cover to be opened when the electronic game device is loaded onto said upper surface so that a user can operate said electronic game device when it is loaded onto said upper surface.

29. A charging cradle for an electronic game device incorporating a rechargeable battery comprising:
   a housing having a first surface and a second surface with a peripheral edge wall therebetween, said housing forming a substantially closed interior chamber, said first surface adapted to engage the electronic game device;
   at least one port in said peripheral edge wall adapted to receive a charging wire connector, said port electrically connected to a pair of charging contacts supported within said substantially closed interior chamber and movable from a normal retracted position where tips of said charging contacts are inside said housing to an in-use extended position where said tips project from said housing;
   an actuator button on said first surface operatively connected to said pair of charging contacts, such that in use, upon engaging the electronic game device with said first surface, said button is depressed, causing said pair of charging contacts to move to said extended position to engage corresponding charging ports on a peripheral edge of the electronic game device; and wherein said pair of charging contacts are adapted to project through respective contact slots formed in a front wall of a sub-housing at a rearward end of said housing, and further wherein said sub-housing expands said substantially closed interior chamber.

30. The charging cradle of claim 29 wherein at least a forward edge of said peripheral edge wall extends above said upper surface.

31. The charging cradle of claim 29 including at least one locator biased to a normal extended position where a tip of said at least one locator projects from said front wall of said sub-housing, said at least one locator adapted to engage within a recess on the peripheral edge of the electronic game device.

32. The charging cradle of claim 31 wherein said at least one locator is between said pair of charging contacts and said recess comprises an AC adaptor port.

33. The charging cradle of claim 29 wherein said sub-housing includes a pivotable panel that, when open, permits access to a game card slot in the peripheral edge of the game device.

34. The charging cradle of claim 29 wherein said button and said charging contacts are attached to a frame pivotally supported within said substantially closed interior chamber, and said port is supported on a fixed, internal wall adjacent said frame; and wherein a pair of lead wires extend from said port to said charging contacts.

* * * * *